(12) United States Patent
Dabak

(10) Patent No.: US 10,678,922 B2
(45) Date of Patent: Jun. 9, 2020

(54) DETECTING ARBITRARY CODE EXECUTION USING A HYPERVISOR

(71) Applicant: NICIRA, INC., Palo Alto, CA (US)

(72) Inventor: Prasad Dabak, Pune (IN)

(73) Assignee: NICIRA, INC., Palo Alto, CA (US)

(\*) Notice: Subject to any disclaimer, the term of this patent is extended or adjusted under 35 U.S.C. 154(b) by 295 days.

(21) Appl. No.: 15/898,236

(22) Filed: Feb. 16, 2018

(65) Prior Publication Data

US 2019/0156036 A1    May 23, 2019

(30) Foreign Application Priority Data

Nov. 23, 2017 (IN) .............................. 201741042134

(51) Int. Cl.
| | |
|---|---|
| *G06F 21/56* | (2013.01) |
| *G06F 12/1009* | (2016.01) |
| *H04L 29/06* | (2006.01) |
| *G06F 21/53* | (2013.01) |
| *G06F 9/455* | (2018.01) |

(52) U.S. Cl.
CPC ........ *G06F 21/566* (2013.01); *G06F 9/45558* (2013.01); *G06F 12/1009* (2013.01); *G06F 21/53* (2013.01); *H04L 63/1416* (2013.01); *H04L 63/1466* (2013.01); *G06F 2009/45583* (2013.01); *G06F 2009/45587* (2013.01); *G06F 2009/45591* (2013.01)

(58) Field of Classification Search
CPC .................................................... G06F 21/566
See application file for complete search history.

(56) References Cited

U.S. PATENT DOCUMENTS

| | | | |
|---|---|---|---|
| 10,033,759 B1* | 7/2018 | Kabra | G06F 9/45545 |
| 2015/0013008 A1* | 1/2015 | Lukacs | G06F 21/53 |
| | | | 726/24 |
| 2015/0356023 A1* | 12/2015 | Peter | G06F 12/1036 |
| | | | 711/208 |
| 2016/0188243 A1* | 6/2016 | Dementiev | G06F 9/467 |
| | | | 711/163 |
| 2017/0124327 A1* | 5/2017 | Kumbhar | G06F 21/566 |
| 2017/0244754 A1* | 8/2017 | Kinder | H04L 63/1425 |
| 2019/0089737 A1* | 3/2019 | Shayevitz | G06N 20/00 |
| 2019/0156036 A1* | 5/2019 | Dabak | H04L 63/1466 |

\* cited by examiner

*Primary Examiner* — Simon P Kanaan

(57) ABSTRACT

The subject matter described herein provides protection against zero-day attacks by detecting, via a hypervisor maintaining an extended page table, an attempt to execute arbitrary code associated with malware in a guest operation system (OS) running within a virtual machine (VM). Further, the subject matter provides detection of lateral movement of the malware. The hypervisor uses hidden breakpoints to detect a request for thread creation, and then determines whether the request is to download and execute arbitrary code.

20 Claims, 6 Drawing Sheets

DETECTING ARBITRARY CODE EXECUTION USING A HYPERVISOR

CROSS-REFERENCE TO RELATED APPLICATION

Benefit is claimed under 35 U.S.C. 119(a)-(d) to Foreign Application Serial No. 201741042134 filed in India entitled "DETECTING ARBITRARY CODE EXECUTION USING A HYPERVISOR", on Nov. 23, 2017, by NICIRA, INC. which is herein incorporated in its entirety by reference for all purposes.

The present application is related in subject matter to U.S. patent application Ser. No. 15/898,237, which is incorporated herein by reference.

This application is related to commonly-owned U.S. Non-Provisional Patent Application entitled "HOST-BASED VIRTUAL MACHINE INTROSPECTION WITH DYNAMIC GUEST ASSISTANCE", U.S. application Ser. No. 15/890,382, filed on Feb. 7, 2018, the entirety of which is incorporated by reference herein.

BACKGROUND

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

For example, while surfing the Internet a user may click on an advertisement that opens a web portal to download controls and arbitrary code in the background which executes to exploit a vulnerability in the browser. This can happen in part because the downloaded arbitrary code runs in the same context as the browser and with the same privileges. The executed arbitrary code is then capable of downloading more payloads and infecting the system further, thereby propagating itself laterally across the system.

Existing anti-malware software provides malware detection and removal. The anti-malware software generally executes with the same privilege as that of the malware. Hence, if new malware is able to exploit a vulnerability in a software system leading to the system being compromised without detection, then the malware may also disable or modify the anti-malware software to continue to avoid detection.

Some anti-malware software includes signature-based anti-virus (AV) programs. These are generally effective against known viruses, but are of little use against zero-day exploits. Zero-day exploits represent the first infection of a previously-unknown virus. This is because the signature-based AV programs rely on prior knowledge of the signature of the virus to detect the attack from the virus. As such, signature-based AV programs cannot protect against zero-day exploits.

BRIEF DESCRIPTION OF THE DRAWINGS

The present description will be better understood from the following detailed description read in the light of the accompanying drawings, wherein.

DETAILED DESCRIPTION

Figure 1:
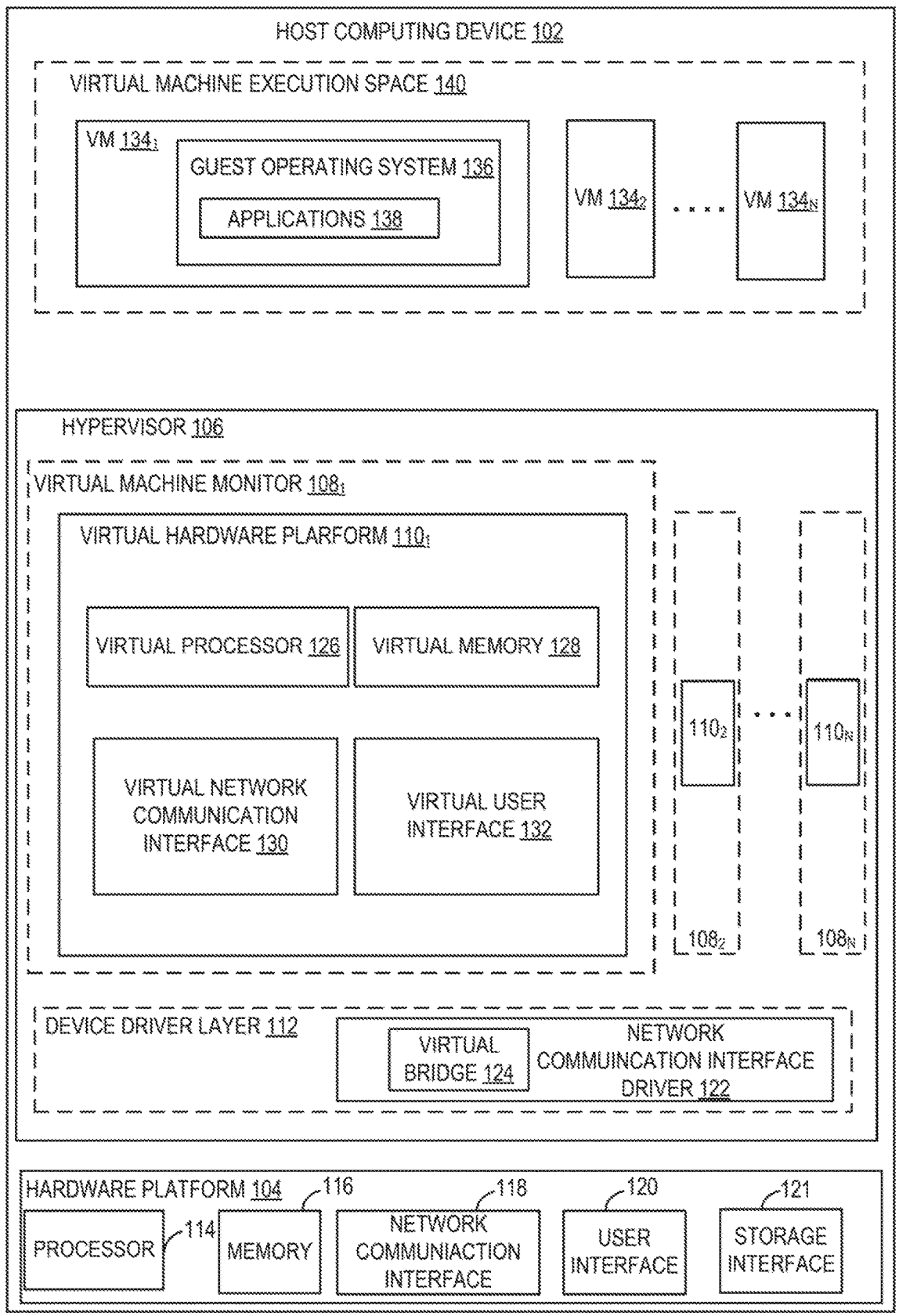
FIG. 1 illustrates a block diagram of a host computing device having a plurality of virtual machines running within the host computing device.

The disclosure monitors for attempted execution of arbitrary code using a hypervisor in a virtualized environment. The virtualized environment includes the hypervisor and one or more virtual computing instances (VCIs) such as virtual machines (VMs) executing on a computing device (see FIG. 1). Each VM has a guest operating system (OS).

In existing systems where malware is able to inject arbitrary code in the guest OS or an application running within the guest OS, the malware begins operating with the same privileges as that of the guest OS. Further, the action of the malware may propagate into a network of VMs and target other susceptible VMs, and the infection spreads across the network.

For example, malware may exploit a function in an application that defines a local array on the stack and then copies an array that has no boundary checks as an input parameter for the function. This results in a stack buffer overflow. In this case, when the function executes, it overwrites the stack, crashes the original return address, and replaces it with an address that points to a location that contains arbitrary code. Hence arbitrary code gets located in the stack. When the function returns, it runs the arbitrary code. As used herein, arbitrary code means code injected by malware, a virus, a worm, a rootkit or any code injected within a kernel, guest OS, or an application with an intention to corrupt the documents/files/functions/libraries or any other object within the VM and possibility steal data and take over the control of the system. This arbitrary code may further deploy additional payloads by creating remote threads and/or injecting libraries (e.g., dynamically linked libraries) in targeted processes already being executed by an application running within the OS.

In contrast, with the disclosure, the hypervisor intercepts requests from a guest OS to execute code. The hypervisor sits between VMs and the physical system and runs with greater privileges. The hypervisor predicts whether or not the code may be considered arbitrary code representing a lateral movement attempt. In general, lateral movement represents deployment of additional payloads by malware using, for example, remote threads and/or dynamically linked library (DLL) injection. Further, lateral movement includes various techniques attackers use to progressively spread through a network as they search for key assets and data. It usually involves activities related to reconnaissance, credentials stealing, and infiltrating other computers. In many cases, lateral movement includes movement from device to device, gaining access privileges to get to the high-value data inside the network. In addition to digging deeper into the network, lateral movement gives attackers additional points of control in a compromised network. To arrest lateral movement, if the code is predicted or determined to be arbitrary code, the hypervisor notifies a security monitoring system of the attempt to execute arbitrary code, and the security monitoring system may take appropriate remediation action (e.g., prevent the arbitrary code from executing).

Additionally, the disclosure includes operations for determining whether a request for creating a thread by a process should be allowed or classified as an attempt at lateral movement associated with malware. The operations use a hidden breakpoint in a thread creation routine to intercept the thread creation request and compare process identifiers (IDs) to predict whether a process is attempting to execute arbitrary code.

Hidden breakpoints are breakpoints inserted on functions of interest. For example, hidden breakpoints are inserted in a kernel function in the guest operating system that is responsible for creating new threads. To insert hidden breakpoints in the kernel function, the hypervisor first determines the kernel function's address in the kernel address space. Thus, an entry point in the kernel function's address space is known. A hidden breakpoint is inserted at this entry point. While an application is being executed by the guest OS, the hypervisor monitors for any breakpoint instruction. If breakpoint instruction is detected, the hypervisor determines the guest context for the breakpoint instruction.

In this manner, the hypervisor provides protection against zero-day attacks or exploits. Further, the operations and systems described herein improve the functioning of a computing device by preemptively detecting an attempt at execution of malware and notifying a security system monitor, thereby increasing device speed, reducing memory usage, and improving processor and data transmission security, among other advantages.

It should be understood that any of the examples given herein are non-limiting. As such, the present disclosure is not limited to any particular embodiments, aspects, concepts, structures, functionalities or examples described herein. Rather, the present disclosure may be used in various ways that provide benefits and advantages in virtualized computing environments in general.

Referring to FIG. 1, an embodiment of a hypervisor-based system with multiple virtual machines on a single host is shown. In this example, the virtual machines $134_1$, $134_2$ . . . $134_N$ are instantiated on a host computing device 102. Host computing device 102 includes a hardware platform 104 (for example, an x86 architecture-based platform). Hardware platform 104 may include processor 114, memory 116, network communication interface 118, user interface 120, and storage interface 121, in addition to other input/output (I/O) devices not shown in FIG. 1. In some example embodiments, executable instructions (e.g., computer program code) are stored in memory 116. The memory, as used in the current application pertains to a random-access memory (RAM), while "storage", as used in the current application pertains to various forms of non-volatile memory such as hard disks drives, solid state drives and the like. External storage may also be accessible to host computing device 102 via storage interface 121 in addition to storage being included within host computing device 102. Both the memory and the storage may exist in virtualized form. A virtualization software layer, including a hypervisor 106, is installed on top of hardware platform 104.

The hypervisor 106 supports a virtual machine execution space 140 within which multiple virtual machines (VMs $134_1$, $134_2$ . . . $134_N$) are concurrently instantiated and executed. Hypervisor 106 includes a device driver layer 112, and maps physical resources of hardware platform 104 (e.g., processor 114, memory 116, network communication interface 118, and/or user interface 120) to virtual resources of each of the VMs $134_1$, $134_2$ . . . $134_N$ such that each of the VMs $134_1$, $134_2$ . . . $134_N$ has its own virtual hardware platform (e.g., a corresponding one of virtual hardware platforms $110_1$-$110_N$), each virtual hardware platform having its own emulated hardware (such as a virtual processor 126, a virtual memory 128, a virtual network communication interface 130, a virtual user interface 132 and other emulated I/O devices (not shown) in VM $134_1$). Hypervisor 106 may manage (e.g., monitor, initiate, and/or terminate) execution of VMs $134_1$, $134_2$ . . . $134_N$ according to the policies associated with hypervisor 106. In addition, or alternatively, hypervisor 106 may manage execution VMs $134_1$, $134_2$ . . . $134_N$ based on requests received from a device other than host computing device 102. For example, hypervisor 106 may receive an instruction specifying the initiation of execution of first VM $134_1$ from a management device via network communication interface 118 and execute the instruction to initiate execution of first VM $134_1$.

Device driver layer 112 includes, for example, a network communication interface driver 122 that interacts with network communication interface 118 to receive and transmit data from, for example, a local area network (LAN, not shown) connected to host computing device 102. Network communication interface driver 122 also includes a virtual bridge 124 that simulates the broadcasting of data packets, in a physical network, received from one communication interface (e.g., network communication interface 118) to other communication interfaces (e.g., the virtual communication interfaces of VMs $134_1$, $134_2$ . . . $134_N$). Each virtual communication interface for each VMs $134_1$, $134_2$ . . . $134_N$, such as virtual network communication interface 130 for first VM $134_1$, may be assigned a unique virtual Media Access Control (MAC) address that enables virtual bridge 124 to simulate the forwarding of incoming data packets from network communication interface 118. In an example, network communication interface 118 is an Ethernet adapter that is configured in promiscuous mode such that all Ethernet packets that it receives (rather than just Ethernet packets addressed to its own physical MAC address) are passed to virtual bridge 124, which, in turn, is able to further forward the Ethernet packets to VMs $134_1$, $134_2$ . . . $134_N$. This configuration enables an Ethernet packet that has a virtual MAC address as its destination address to properly reach the target VM in host computing device 102 with a virtual communication interface that corresponds to such virtual MAC address.

Virtual hardware platform $110_1$ may function as an equivalent of a standard hardware architecture such that any x86-compatible desktop operating system may be installed as guest OS 136 in order to execute applications 138 for an instantiated VM, such as first VM $134_1$. Some exemplary, non-limiting, operating systems may be Microsoft WINDOWS® brand operating system, LINUX® brand operating system, SOLARIS® brand operating system, Mac OS® brand operating system and the like that run on x86-architecture or other operating systems that may run on other architectures. Virtual hardware platforms $110_1$-$110_N$ may be considered to be part of virtual machine monitors (VMM) $108_1$-$108_N$ that implement virtual system support to coordinate operations between hypervisor 106 and corresponding VMs $134_1$, $134_2$ . . . $134_N$.

Those with ordinary skill in the art will recognize that the various terms, layers, and categorizations used to describe the virtualization components in FIG. 1 may be referred to differently without departing from their functionality or the spirit or scope of the present disclosure. For example, virtual hardware platforms $110_1$-$110_N$ may also be considered to be separate from VMMs $108_1$-$108_N$, and VMMs $108_1$-$108_N$ may be considered to be separate from hypervisor 106. Further, in some embodiments, there may not be any virtual machine monitor and hypervisor 106 may perform the functions of each virtual machine monitor VMMs $108_1$-$108_N$ in addition to its own functions. One example of hypervisor 106 that may be used in an example of the application is included as a component in VMware's ESX® brand software, which is commercially available from VMware, Inc. In some other embodiments, there may not be any hypervisor and respective virtual machine monitors may perform all the functions for their associated VMs. In such cases, each VMM may be considered as a hypervisor for its associated VM.

Figure 2:
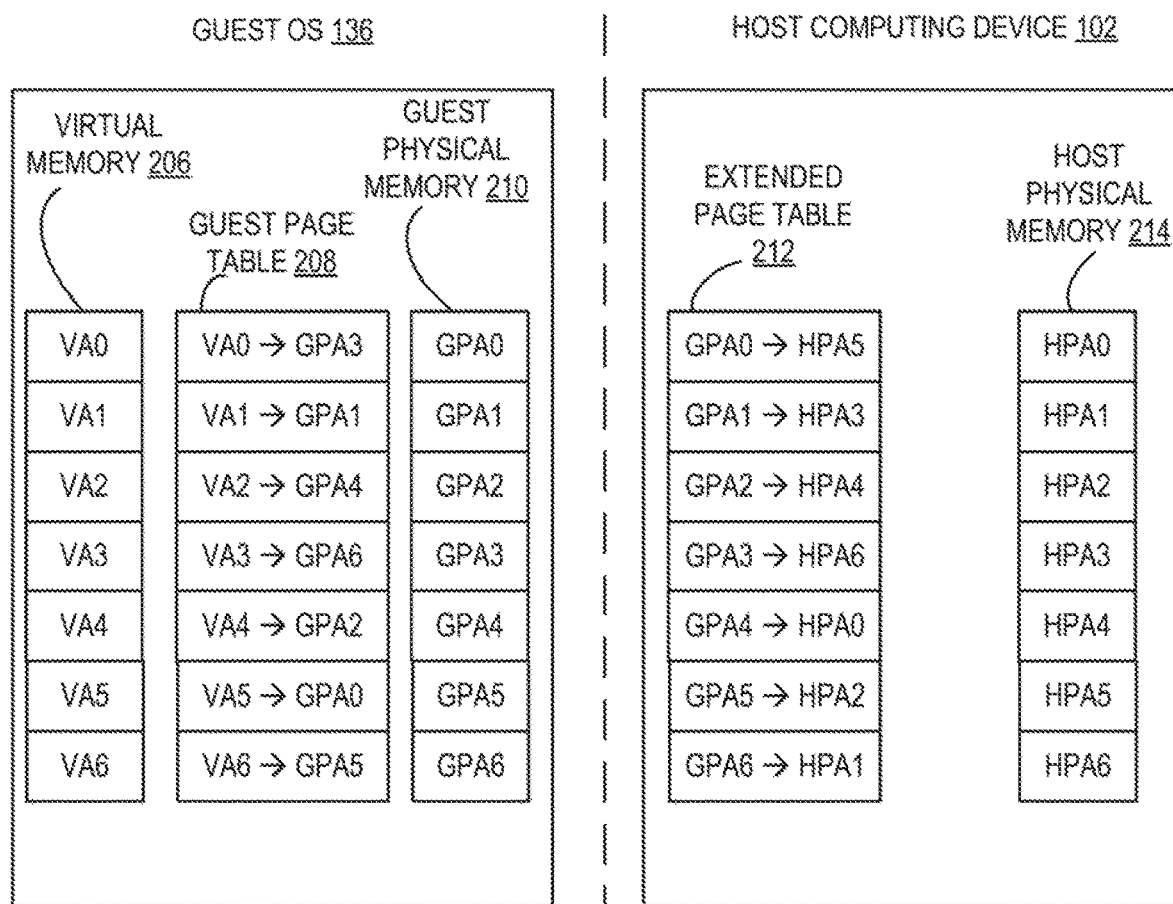
FIG. 2 illustrates a block diagram of two levels of address translation for operation of a guest operating system within a host.

FIG. 2 shows a process of second level address translation (SLAT) using an extended page table. A part of the guest virtual memory 206 shows guest virtual addresses for a part of a process running in the guest OS. A memory translation unit maps a guest virtual address such as VA0 to a corresponding guest physical address as shown in the guest page table 208. Hence, the guest page table 208 maps (e.g., converts) each virtual address in the virtual memory address space to a corresponding physical address in the guest physical memory 210. For example, VA0 is mapped to GPA3, VA1 is mapped to GPA1, VA2 is mapped to GPA4, VA3 is mapped to GPA6, VA4 is mapped to GPA2, VA5 is mapped to GPA0, and VA6 is mapped to GPA5.

In a non-virtualized environment, the page table entry indicates a physical address corresponding to a virtual address as indicated by the instruction pointer. This physical address is put on the address bus and used for fetching the value stored at the physical address pointed to by the instruction pointer. However, in case of a guest OS operating within a VM, a second level of address translation is required which is controlled by the hypervisor. The guest physical address indicated by the guest page table 208 is further mapped to a corresponding host physical address. This information is provided by the Extended Page Table Entry (EPTE). The hypervisor maps a guest physical page (GPP) to a corresponding host physical page (HPP) by making an entry in the extended page table (EPT) 212 when a guest OS attempts to access a GPP. The hypervisor not only maps the GPP to a corresponding HPP, it also sets the access attributes for the GPP such as read/write/execute access. Thus, for any process executing on a guest OS, the first level of address translation occurs using the guest page table 208 which is within the guest OS space. In the host space, the hypervisor adds an entry in the EPT 212 that map a GPP to corresponding HPP. For example, a guest address GPA0 is mapped to a host address HPA5 and so on as shown in the FIG. 2.

It may be noted that the EPT, as referred to above, and used hereinafter, is a term used by Intel® for hardware support available in their processors for Second Level Address Translation (SLAT), as discussed above and hereinafter. However, AMD® refers to the hardware support available in their processors for Second Level Address Translation as Rapid Virtualization Indexing (RVI) or Nested Page Table (NPT). Hence, the NPT is functionally equivalent to the EPT, and the two terms should be treated as equivalents for the purpose of this application. Through NPT or EPT respectively, the AMD-V and the Intel VT processors maintain address mappings, and this functionality is utilized by the hypervisor to perform the two levels of address space translations required for each VM.

Hence, to execute a GPP in a VM, the guest page table should have an entry marking the GPP as executable. Secondly, the extended page table that maps the GPP to a corresponding HPP should also have an entry making the GPP as executable. The process of provisioning an HPP corresponding to a GPP occurs lazily. That is, in the process of lazy provisioning, the hypervisor does not initially provision an HPP corresponding to each GPP when a guest OS is executing an application. The hypervisor provisions an HPP with a corresponding access permission (e.g., read and/or write and/or execute) when a process attempts to read/write/execute a given GPP for the first time. Hence, the second level of address translation is performed by the hypervisor via a lazy provisioning process in which the access permissions are lazily mirrored between the GPP and the HPP.

In lazy provisioning, the hypervisor (e.g., hypervisor 326, shown in FIG. 3) provisions the HPP with read/write/execute (R/W/E, hereinafter) access only when a GPP is read, written to, or executed by the guest OS (e.g. guest OS 316, shown in FIG. 3). For example, assume that the guest OS provisions a new GPP with R/W/E access. However, at this point in time there is no GPP to HPP mapping for this page in EPT because the hypervisor has not set up the second level page mapping. An attempt by the guest OS to read/write/execute off a GPP (corresponding to which there is no EPT entry) results in an "EPT not present" violation. The hypervisor at this stage provisions an HPP corresponding to the GPP with read/write/execute (R/W/E) access. It may also happen that the guest OS may provision a GPP with R/W access to begin with. An attempt by the guest OS to read/write to the GPP results in an EPT violation which will result in provisioning the HPP with R/W access. Subsequently, the guest OS may add execute permission on the GPP. At this point, the HPP still has only R/W access. When the guest OS actually attempts to execute off a GPP, the result is an "EPT Execute" violation. At this stage, hypervisor would add the execute permission on the corresponding HPP and re-starts the violation-generating instruction to which the virtual instruction pointer (corresponding to the GPP) is pointing.

The action of the hypervisor to allow a GPP to be executed for the first time is monitored (whether during initial provisioning of the HPP or when updating the HPP with execute permission) and used as a trigger or breakpoint for the hypervisor to analyze the request, and generate a corresponding notification. For example, further actions may be taken to determine whether the EPT violation-generating instruction is a legitimate instruction and should be allowed to be executed, or if it should be classified as an attempt to execute arbitrary code, as described with reference to FIG. 4.

Figure 3:
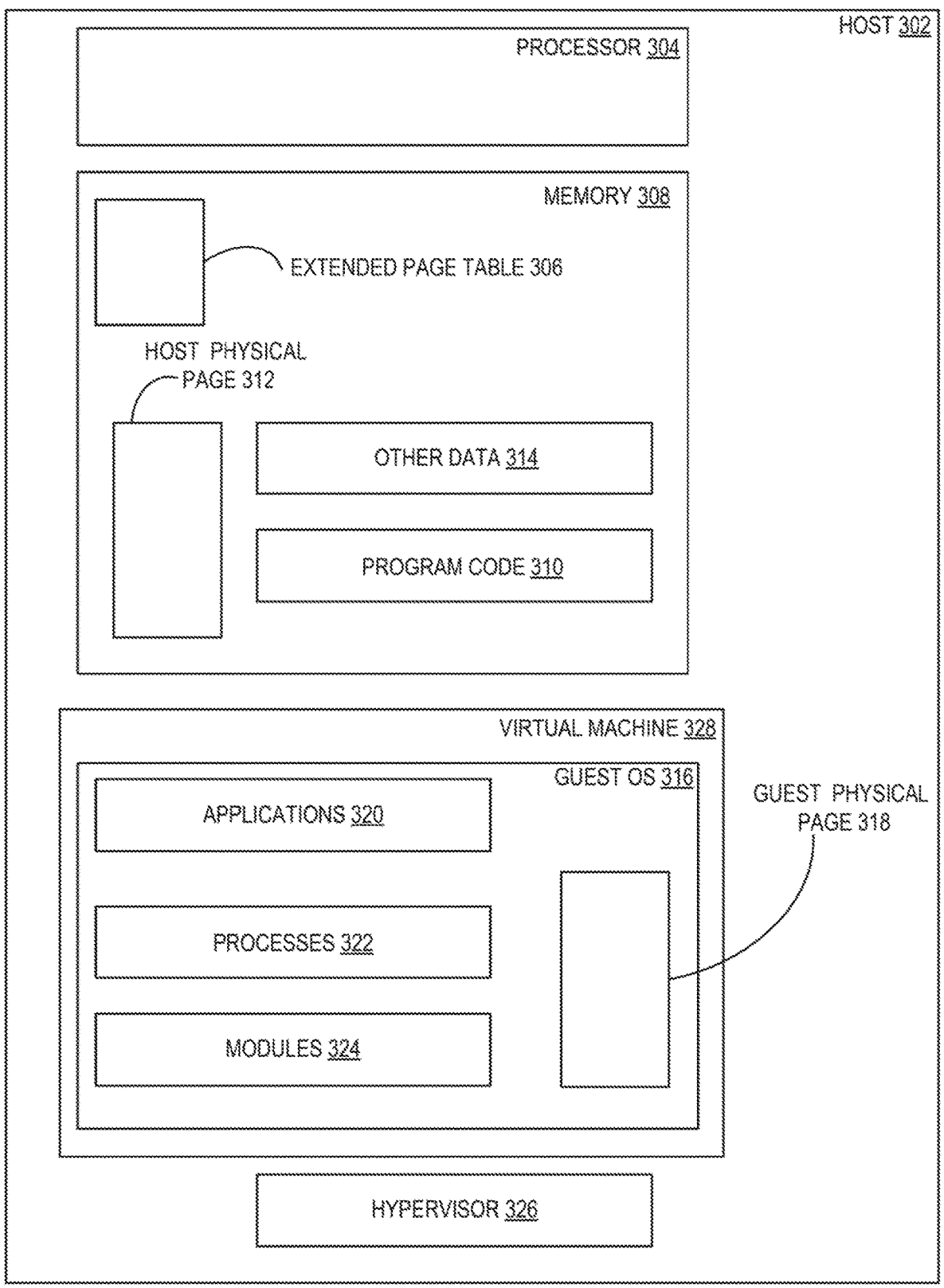
FIG. 3 illustrates a block diagram of host comprising a processor, a memory and employing a hypervisor to host a virtual machine (VM)

FIG. 3 shows a block diagram of a host 302 hosting a VM 328. A guest OS 316 operates within the VM 328. The host 302 has at least a processor 304. The host 302 also has a memory 308 that at least includes an EPT 306, HPP 312, program code 310 and other data 314 in addition to some other data and/or instructions that may be required to be stored and/or executed (not shown). The program code 310 and other data 314 are physical representations of the same in the guest OS 316. In some examples, the EPT 306 may be a processor-hardware supported EPT. The guest OS 316 includes at least applications 320, processes 322 pertaining to the execution of applications 320, and modules 324 loaded during execution of one or more of the applications

320. A module is a component, logic, instructions, operations, or code that provides functionalities to the applications 320. Examples of modules include libraries (e.g., DLLs), I/O modules, storage modules, security modules, networking modules and the like. A GPP 318 is shown within the guest OS that may be required to be executed during execution of one or more of the applications 320.

A hypervisor 326 running within the host 302 facilitates provisioning and execution of the GPPs during execution of the one or more of the applications 320. As shown in FIG. 3, hypervisor 326 runs within the host and has higher privileges to enable access and executing of instructions and/or data by various processes running within the guest OS.

Figure 4:
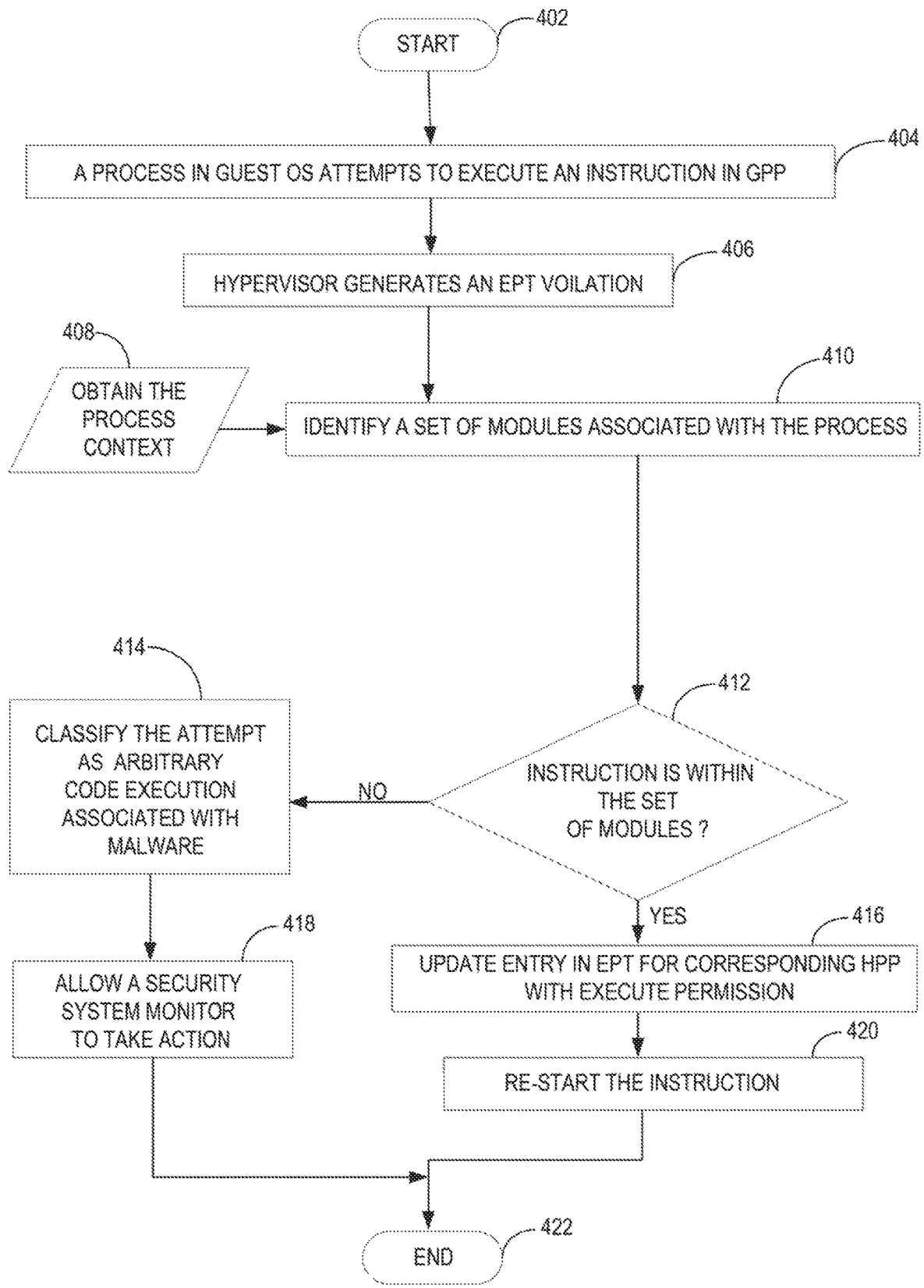
FIG. 4 is a flowchart illustrating a process of monitoring, by a hypervisor, execution of an instruction in a guest physical page to determine whether the instruction is associated with an arbitrary code.

The system of FIGS. 1-3 when programmed to perform the operations in FIG. 4 represents a system for hypervisor detection of attempted arbitrary code execution to detect zero-day exploits.

Referring to FIG. 4, a flowchart illustrates a method of updating an entry in the EPT (e.g., EPT 306) by a hypervisor (e.g., hypervisor 326) upon a guest OS (e.g., guest OS 316) attempting to execute an instruction in a GPP (e.g., GPP 318), and analyzing the instruction to determine whether it is arbitrary code. The method begins at 402. At 404, a process in the guest OS 316 attempts to execute an instruction existing in GPP 318. At 406, memory and computer program code are configured to, in conjunction with a physical processor, cause the hypervisor 326 to generate an EPT violation (e.g., an "EPT not present" violation or an "EPT execute" violation, as discussed above) in response to the attempt by the process in the guest OS 316 to execute the instruction existing in the GPP 318. The intervention by the hypervisor 326 provides a hook in the hypervisor 326 and enables a determination if the virtual address to which the virtual instruction pointer is pointing lies within the code sections of the legitimate set of modules loaded in a process that corresponds to the current execution context of the guest OS 316 (the pointer in a virtual instruction pointer register is sometimes referred to as VRIP). The EPT violation occurs because, at this stage the GPP 318 does not have (i.e., lacks) an HPP (e.g., HPP 312) corresponding to the GPP 318 in the EPT 306. That is, the GPP 318 does not have (i.e., lacks) an entry in EPT 306 corresponding to the instruction. In response to the generated EPT violation, at 408 a process context for the process is obtained.

For example, in Microsoft Windows®, GS:[188h] points to KTHREAD/ETHREAD data structure of the currently running thread and KTHREAD:[220h] points to KPROCESS/EPROCESS data structure of the current process context. The list of modules loaded in the current process context can be examined using Process Environment Block (PEB) stored at EPROCESS[3f8h]. Thus, the knowledge of the internal data structure layout of the guest OS enable determination of the current process context that identifies a set of legitimate modules associated with the process. It can, therefore, be determined if the VRIP points to a memory location that lies within the code sections of the set of legitimate modules loaded in the process. For example, if the VRIP does not point to legitimate code sections, a potential arbitrary code execution is detected.

At 410, based on the obtained process context, a set of modules are identified that is associated with the process. At 412, a determination is made as to whether the instruction is within any of the identified set of modules. Upon determining that the instruction is within the identified set of modules, at 416 an entry in the EPT 306 is updated by the hypervisor 326. The hypervisor 326 maps (i.e., converts) the GPP to a corresponding host physical page (HPP) 312 with R/W/E permissions thus updating the EPT 306 and to allowing the instruction to be executed. At 420, the instruction is re-started.

However, if it is determined at 412 that the instruction does not lie within the set of modules associated with the process (that is the instruction is outside the identified set of modules), the attempt by the guest OS 316 to execute the instruction in GPP 318 is classified by the hypervisor 326 as an attempt to execute arbitrary code that is associated with malware and a security system monitor in the host 302 is allowed to take suitable remediation action based on a policy of the host 302. The security system monitor may decide to suspend the guest OS 316 or the VM 328, quarantine the guest OS 316 or the VM 328, or remove the guest OS 316 or the VM 328 from the network and the like. Hence, at 418, the security system monitor takes suitable action. The method ends at 422. Thus, using the hypervisor and knowledge of the internal layout of the guest OS into which the malware is attempting to inject arbitrary code, a zero-day attack is detected before the malware has an opportunity to execute the arbitrary code.

As next described with reference to FIG. 5, the disclosure operates to detect lateral movement by code, whether arbitrary or otherwise. That is, the operations illustrated and described in FIG. 5 may be performed in conjunction with, or separate from, the operations illustrated and described in FIG. 4.

Code, whether malicious or not, may attempt to load additional payloads using legitimate means by creating new threads and loading additional code (e.g., dynamically linked libraries (DLLs)). The disclosure determines whether the code is trying to act maliciously by performing the operations described in FIG. 5.

As background, most OSs have application programming interfaces (APIs) that facilitate creation of new threads. For example, Microsoft Windows® has APIs for creation of remote threads and loading DLLs. The disclosure determines if new thread creations are part of an attempt at lateral movement to propagate malware across the network by performing operations. This provides an additional benefit, amongst others, that if the malware attempts lateral movement, the attempt is detected and suitable remediation action may be taken.

In general, the system for hypervisor detection of attempted arbitrary code execution to detect zero-day exploits (and take suitable remediation measures) includes determining whether a request for creating a thread by a process should be allowed or classified as an attempt at lateral movement associated with malware. The system comprises at least one physical processor and at least one memory embodying computer program code. The at least one memory and the computer program code is configured to, with the at least one physical processor, cause the physical processor to at least perform operations as described in FIG. 5. The at least one memory and the computer program code is configured to, with the at least one physical processor, cause the physical processor to at least detect, by the hypervisor via a hidden breakpoint, a request from a current process in a guest OS to create a thread. The hidden breakpoints are described in the application incorporated by reference herein as given above. The request includes a process identifier (ID) for the thread. In response to detecting the request, a determination is made as to whether the process ID for the current process is different from the process ID for the thread and different from the process ID for a parent process of the thread. If it is determined that the process ID for the current process is different from the process ID for the thread and/or different from the process ID for the parent process of the thread, additional checks are performed. The additional checks at least comprise obtaining a thread context for the thread and a process context for the current process, the thread context identifying an entry point for the thread, the process context identifying a set of modules associated with the current process. Further, it is determined whether the entry point is at least within an address space of one of the identified set of modules and/or not associated with a function that loads other code. Upon determining that the entry point is within the address space of one of the identified set of modules and not associated with a function that loads other code, the request for creating the new thread is allowed by creating the thread. However, if it is determined that the entry point is not within the address space of one of the identified set of modules (that is the entry point is outside the identified set of modules) and/or is associated with a function that loads other code, the request to create a new thread is classified as an attempt at lateral movement associated with malware and a security monitoring system is notified for taking suitable action based on a policy associated with the host 302 as discussed earlier. Hence, another advantage of the present disclosure, among others, is that it detects attempts at propagation of malware across the network of VMs, and possible infection of other VMs on the network.

In one example embodiment, the hidden breakpoint is put on a specific (e.g., pre-defined) function of interest that is used by the current process to create a thread. However, those skilled in the art will note that the hidden breakpoint may be put on any function that is used by the current process to create a thread. Further, to determine whether the entry point is within one of the identified set of modules, a check is made to determine if the entry point is in a legitimate code region associated with the identified set of modules. Moreover, in one example, the set of modules associated with the current process are identified by walking the operating system-specific data structures.

In a further example, identification of the entry point in a kernel that is responsible for creating new threads is done by locating the address of the kernel function and putting hidden breakpoints on that address. The breakpoints are hidden from the running application/guest OS/malware. Using the hidden breakpoints, for each new thread creation, it is determined if the created new thread is a remote thread or a local thread. In some cases, a remote thread may be a potential malware thread. In most OS, legitimate remote threads and new threads are created by various processes. Further checks are, therefore, performed by the hypervisor when a request for creation of new threads is received, as discussed below with respect to FIG. 5.

Figure 5:
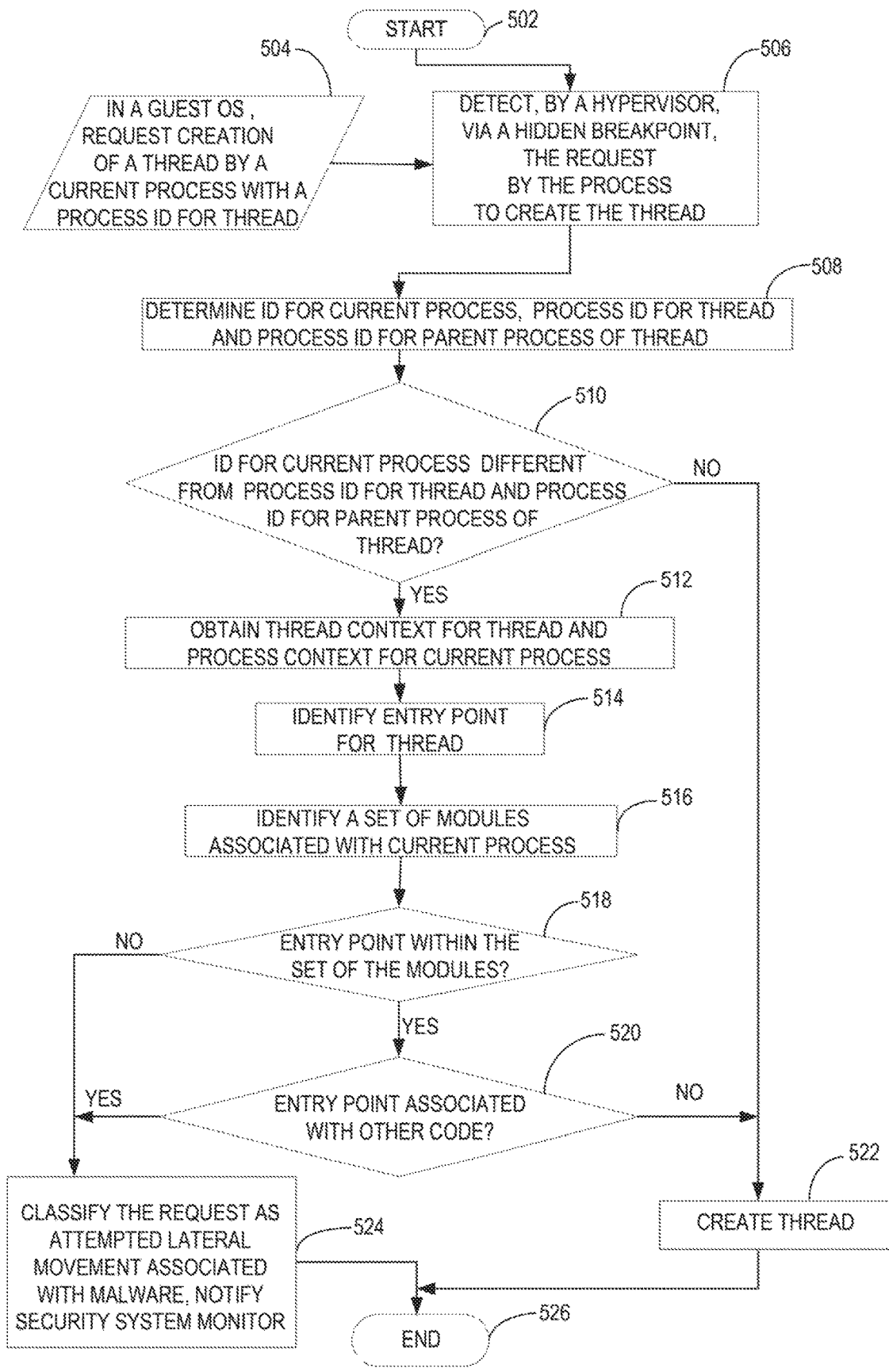
FIG. 5 is a flowchart illustrating a process of determining, by a hypervisor, via hidden breakpoints, if a request by a process to create a thread is legitimate.

In the example of FIG. 5, a guest OS is running an application that is instrumented with hidden breakpoints. Hidden breakpoints are inserted in application execution path of a VM to monitor lateral movement of malware using the hypervisor. The hidden breakpoints are transparent to the VM and the guest OS, while they are inserted at entry points of interest where execution of a function is required to be intercepted. First entry points of interest are identified and their addresses are determined. Then hidden breakpoints are then placed on them. The hypervisor maintains two versions of a GPP. The version of the GPP that is fetched for the execution stream contains breakpoint instructions. While in the read version of the same GPP, there is no breakpoint and the hypervisor would return the read version in response to running off a debugger. Thus, using hidden breakpoint instructions, execution of a function in a guest OS is intercepted without the guest OS being aware of it. For example, in case of Microsoft Windows®, hidden breakpoints can be put on the Windows® internal function PspCallThreadNotifyRoutines. This function is responsible for calling the thread notification routines registered by various kernel components in the guest OS using PsSetCreateThreadNotifyRoutine API. Using hidden breakpoints in such functions, notifications can be received whenever a new thread is created. The hypervisor monitors the notifications and whenever the guest OS creates a new thread, the hypervisor obtains a hook at that point.

The process begins at 502. At 504, a current process in the guest OS requests creation of a thread using another process for creation of the thread, the other process having its own process identification (ID). At 506, the hypervisor detects, via at least one hidden breakpoint, the request to create the thread. At 508, process ID for the current process, process ID for the process creating the thread and process ID for the parent of the process creating the thread are determined. Because of the knowledge of the internal layout of the data structures of the guest OS (e.g., Microsoft Windows® internal structure and layout) and hidden breakpoints inserted in the concerned functions, whenever the guest OS attempts to create a new thread, attributes of the processes involved can be determined. A first attribute is the current process context including the process identifier (ID) of the current process. The current process ID may be called CPID. A second attribute is the process ID of the process in which the new thread is being created. The process ID of the process in which the new thread is being created is referred to as PTID. A third attribute is the process ID of the parent of the process in which the new thread is being created. The process ID of the parent of the process in which the new thread is being created is referred to as parent (PTID).

For non-remote threads, which are legitimate threads, CPID is equal to PTID and no further checks are required before allowing the creation of new thread because the process ID of the process in which the new thread is being created matches with the process ID of the current process.

However, if CPID is not equal to PTID, the thread that is being created is potentially a remote thread. As discussed earlier, a remote thread may potentially be a rogue thread, but it may as well be legitimate thread. This is because a primary thread of a process is created by the parent process. Hence if a process A creates a process B then the first thread in process B is created by process A. It means that the first thread of a process by definition is a remote thread, but it is a legitimate thread. The disclosure performs additional checks before allowing creation of a new thread.

In an example embodiment, to establish that the new thread that is being created is a primary thread, the process ID of the current process is compared with the process ID of the parent of the process that is creating the new thread. A mathematical representation of this is to check whether CPID=parent (PTID). The new thread is the only thread being created by the process that is creating the new thread. If these conditions are met, the newly created thread is considered as a primary thread and treated as a special case, and not an illegitimate thread.

Hence, at 510, a check is made to determine if the process ID for the current process is different from the process ID for the process creating the new thread and the process ID for the parent process of the new thread that is being created. If it determined that the process ID for the current process is not different from the process ID for the process creating the new thread and the process ID for the parent process of the new thread, then at 522, the new thread is allowed to be created and the process ends at 526.

However, if CPID is not equal to PTID and/or CPID is not equal to parent (PTID), then additional checks are performed to ensure that creation of the new thread is not an attempt at lateral movement associated with malware. At 512, a thread context for the new thread and the process context for the current process are obtained. Checking the thread context includes identifying, at 514, the entry point of the thread (i.e., the location in the memory where the thread would begin its execution). A set of modules associated with the current process are identified at 516. The entry point of the thread should be within the legitimate set of modules loaded by the current process as identified at 516. If a thread attempts to begin execution at an arbitrary location in the memory rather than within the legitimate set of modules loaded by the current process, it is considered to be a rogue remote thread.

At 518, it is determined whether the entry point for the new thread is within an address space of at least one of the modules associated with the current process. If it is determined that the entry point for the new thread is not within the address space of at least one of the modules associated with the current process (i. e., the entry point is outside the modules associated with the current process), then at 524, the new thread creation request is classified as an attempt at lateral movement associated with malware and a security system monitor within the host 302 is notified. The security system monitor may decide to suspend the guest OS 316 or the VM 328, quarantine the guest OS 316 or the VM 328, or remove the guest OS 316 or the VM 328 from the network and the like. Nevertheless, it is possible that while the entry point of the thread points to a legitimate location, the malware injects arbitrary code in subsequent locations and the thread may attempt to execute the arbitrary code. In such cases the malware may exploit one or more existing functions available in the OS kernel, and pass library names as the thread parameters. When the otherwise legitimate thread begins to execute, it loads a malware specified library in the target process and thus malware specified arbitrary code gets executed.

For example, Windows® KERNEL32.DLL functions have an exported function called LoadLibrary that takes one parameter that is a DLL name. Malware writer may allocate the data block in the target process, copy the DLL name there and then create a remote thread with a start address of the LoadLibrary function and pass the remote address where DLL name is injected as a thread parameter. When the thread begins execution, it will load the malware-specified library in the target process, which then gets executed.

Therefore, if it is determined that the entry point for the new thread is within at least an address space of one of the modules associated with the current process, then at 520 it is checked whether the entry point is associated with some other code. As discussed above, it is possible that malware may insert a malware-specified DLL/library/other arbitrary code even when the entry of the newly created thread points to a legitimate location in the memory. Therefore, a further check is done at 520 to ensure that the new thread would not execute unwanted code.

In cases where the malware attempts to exploit a functionality available in an OS kernel function to pass the malware-specified library as a thread parameter, the hypervisor would be notified via the hidden breakpoint. A process similar to the process of checking the current context of the thread is used to determine whether what is being executed currently is within the legitimate modules loaded in the current process.

In one example embodiment, if the hidden breakpoint reveals creation of a remote thread in a process with the start address of some specific OS kernel functions, execution of such functions is monitored via hidden breakpoints by the hypervisor. A process similar to the process discussed above is performed. Additionally, malware may exploit an existing thread rather than creating a new remote thread by changing its thread context to point to a location in the memory where arbitrary code is injected. Hence, in an example embodiment, hidden breakpoints are inserted in all OS kernel functions and APIs that allow setting context or changing an existing thread context. For example, some Microsoft Windows® APIs allow temporarily suspending an existing thread, changing it instruction pointer to a different location in memory and then resuming the thread to begin execution from the newly-pointed location. Hidden breakpoints are inserted in all such functions and APIs of an OS that allow changing the thread context. Thread process ID checks and entry point checks similar to those discussed above, are then conducted to determine if the changed context is a legitimate context.

If, the entry point is legitimate and it is not associated with unwanted code, then at 522, the new thread is allowed to be created. However, if it is determined at 520 that the entry point is associated with some other code, the request is again classified as an attempt for lateral movement associated with malware and the security system monitor is notified for remedial action. The process ends at 526.

Exemplary Operating Environment

Figure 6:
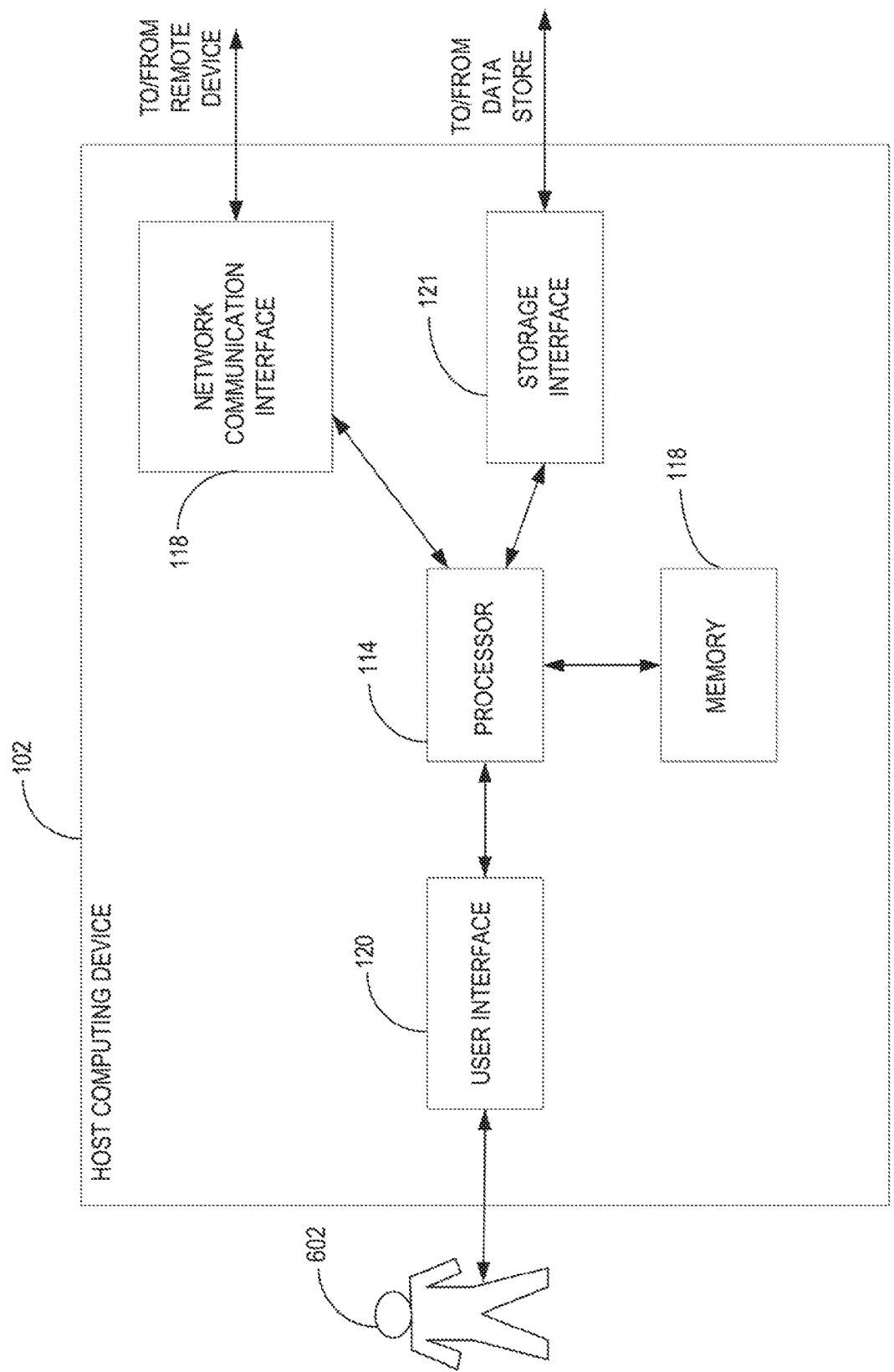
FIG. 6 is a generalized block diagram of a host computing device illustrating communication with external objects.

A generalized block diagram of host computing device 102 that illustrates communication with external objects is shown in the example of FIG. 6. A user 602 interacts with the host computing device 102 via user interface 120. Network communication interface 118 facilitates communication with a remote device (e.g., another computing device). Storage interface 121 facilitates communication with one or more data stores, that may store virtual disk images, software application other than applications 138 and/or any other data suitable for use with the systems and methods described herein. In some exemplary embodiments storage interface 121 couples host computing device 102 to a storage area network (SAN) (e.g. a Fiber Channel network), and/or to a network-attached storage (NAS) system. In some embodiments storage interface 121 may be integrated with network communication interface 118.

While some virtualized embodiments are described with reference to VMs for clarity of description, the disclosure is operable with other forms of virtual computing instances (VCI). A VCI may be a VM, a container, and/or any other type of virtualized computing instance.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In some examples, VMs may be used alternatively or in addition to the containers, and hypervisors may be used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Various operations illustrated in the figures (e.g., FIG. 5 and FIG. 6) and described in the corresponding description of the figures can be performed by non-transitory computer-executable instructions stored in suitable forms of storage and/or memory and executed by one or more processors.

The detailed description provided above in connection with the appended drawings is intended as a description of a number of embodiments and is not intended to represent the only forms in which the embodiments may be constructed, implemented, or utilized. Although these embodiments may be described and illustrated herein as being implemented in devices such as a server, computing devices, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'server', 'computing device' and the like are used herein to refer to any device with processing capability such that it can execute instructions. Those skilled in the art will realize that such processing capabilities are incorporated into many different devices and therefore the terms 'computer', 'server', and 'computing device' each may include PCs, servers, laptop computers, mobile telephones (including smart phones), tablet computers, and many other devices.

Any range or device value given herein may be extended or altered without losing the effect sought, as will be apparent to the skilled person. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for detecting, via a hypervisor, attempts to execute arbitrary code associated with malware in guest operating systems running within a VM, attempts at lateral movements of the malware to spread itself across the network of VMs, and exemplary means for detecting the arbitrary code being run and detecting lateral movement of the malware.

The term "comprising" is used in this specification to mean including the feature(s) or act(s) followed thereafter, without excluding the presence of one or more additional features or acts.

What is claimed is:

1. A system for hypervisor detection of attempted arbitrary code execution in zero-day exploits, said system comprising:
    at least one physical processor; and
    at least one memory comprising computer program code, the at least one memory and the computer program code configured to, with the at least one physical processor, cause the physical processor to at least:
        generate, by a hypervisor, an extended page table (EPT) violation in response to an attempt by a process in a guest operating system (OS) to execute an instruction in a guest physical page (GPP);
        in response to the generated EPT violation, obtain process context for the process, the process context identifying a set of modules associated with the process;
        determine whether the instruction is within any of the identified set of modules; and
        upon determining that the instruction is outside the identified set of modules, classify the attempt as arbitrary code execution associated with malware.

2. The system of claim 1, wherein the hypervisor converts virtual addresses in virtual memory into physical addresses in physical memory, and wherein permissions are lazily mirrored between the virtual memory and the physical memory.

3. The system of claim 1, wherein the EPT violation is generated when the GPP lacks a corresponding host physical page (HPP) or has a corresponding HPP that lacks execute permission.

4. The system of claim 1, wherein the computer program code is configured to determine that the instruction to be executed is located within a stack, and classify the attempt as arbitrary code execution.

5. The system of claim 1, wherein the computer program code is configured to notify a security monitor system to quarantine the guest OS or quarantine a virtual machine that runs the guest OS after classifying the attempt as arbitrary code execution.

6. The system of claim 1, wherein the computer program code is configured to determine whether the instruction is within any of the identified set of modules by checking whether an instruction pointer associated with the instruction points to a legitimate code region associated with the identified set of modules.

7. The system of claim 1, wherein the computer program code is further configured to update an entry in the EPT for a corresponding HPP with execute permission to allow the instruction to execute, and restart the instruction.

8. A method for hypervisor detection of attempted arbitrary code execution in zero-day exploits, said method comprising:
    generating, by a hypervisor, an extended page table (EPT) violation in response to an attempt by a process in a guest operating system (OS) to execute an instruction in a guest physical page (GPP);

in response to the generated EPT violation, obtaining process context for the process, the process context identifying a set of modules associated with the process;

determining whether the instruction is within any of the identified set of modules; and upon determining that the instruction is outside the identified set of modules, classifying the attempt as arbitrary code execution associated with malware.

9. The method of claim 8, wherein the hypervisor converts virtual addresses in virtual memory into physical addresses in physical memory, and wherein permissions are lazily mirrored between the virtual memory and the physical memory.

10. The method of claim 8, wherein the EPT violation is generated when the GPP lacks a corresponding host physical page (HPP) or has a corresponding HPP that lacks execute permission.

11. The method of claim 8, wherein determining comprises determining that the instruction to be executed is located within a stack, and classifying the attempt as arbitrary code execution.

12. The method of claim 8, further comprising notifying a security system monitor to quarantine the guest OS or quarantine a virtual machine that runs the guest OS after classifying the attempt as arbitrary code execution.

13. The method of claim 8, wherein determining whether the instruction is within any of the identified set of modules comprises checking whether an instruction pointer associated with the instruction points to a legitimate code region associated with the identified set of modules.

14. The method of claim 8, further comprises updating an entry in the EPT for a corresponding HPP with execute permission to allow the instruction to execute, and restarting the instruction.

15. One or more non-transitory computer storage media having computer-executable instructions that, upon execution by a processor, cause the processor to at least perform operations comprising:

generating, by a hypervisor, an extended page table (EPT) violation in response to an attempt by a process in a guest operating system (OS) to execute an instruction in a guest physical page (GPP);

in response to the generated EPT violation, obtaining process context for the process, the process context identifying a set of modules associated with the process;

determining whether the instruction is within any of the identified set of modules; and upon determining that the instruction is outside the identified set of modules, classifying the attempt as arbitrary code execution associated with malware.

16. The one or more non-transitory computer storage media of claim 15, wherein the hypervisor converts virtual addresses in virtual memory into physical addresses in physical memory, and wherein permissions are lazily mirrored between the virtual memory and the physical memory.

17. The one or more non-transitory computer storage media of claim 15, wherein the EPT violation is generated when the GPP lacks a corresponding host physical page (HPP) or has a corresponding HPP that lacks execute permission.

18. The one or more non-transitory computer storage media of claim 15, wherein the operations comprise determining that the instruction to be executed is located within a stack, and classifying the attempt as arbitrary code execution.

19. The one or more non-transitory computer storage media of claim 15, wherein the operations comprise notifying a security system monitor to quarantine the guest OS or quarantine a virtual machine that runs the guest OS after classifying the attempt as arbitrary code execution.

20. The one or more non-transitory computer storage media of claim 15, wherein the operations comprise determining whether the instruction is within any of the identified set of modules by checking whether an instruction pointer associated with the instruction points to a legitimate code region associated with the identified set of modules.

* * * * *